(12) United States Patent
Ogasawara

(10) Patent No.: US 11,216,907 B2
(45) Date of Patent: Jan. 4, 2022

(54) IMAGE GENERATING APPARATUS, METHOD, AND PROGRAM FOR DISPLAYING IMAGE RESOLUTION WITH MOTION IN HEAD-MOUNTED DISPLAY (HMD)

(71) Applicant: SONY INTERACTIVE ENTERTAINMENT INC., Tokyo (JP)

(72) Inventor: Hidehiko Ogasawara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/609,254

(22) PCT Filed: May 18, 2017

(86) PCT No.: PCT/JP2017/018736
§ 371 (c)(1),
(2) Date: Oct. 29, 2019

(87) PCT Pub. No.: WO2018/211672
PCT Pub. Date: Nov. 22, 2018

(65) Prior Publication Data
US 2020/0051207 A1  Feb. 13, 2020

(51) Int. Cl.
*G06T 3/40* (2006.01)
*G06F 3/01* (2006.01)

(52) U.S. Cl.
CPC ............... *G06T 3/40* (2013.01); *G06F 3/012* (2013.01)

(58) Field of Classification Search
CPC . G06T 3/40; G06F 3/012; G06F 3/013; G06F 1/163; G06F 3/011; G06F 1/1686;
(Continued)

(56) References Cited

U.S. PATENT DOCUMENTS

2004/0227703 A1  11/2004 Lamvik et al.
2010/0103077 A1   4/2010 Sugiyama et al.
(Continued)

FOREIGN PATENT DOCUMENTS

JP    H1252993 A    10/1989
JP    2016-165105 A   9/2016
(Continued)

OTHER PUBLICATIONS

International Search Report and Written Opinion dated Aug. 15, 2017, from International Application No. PCT/JP2017/018736, 9 sheets.
(Continued)

*Primary Examiner* — Michael Le
(74) *Attorney, Agent, or Firm* — Katten Muchin Rosenman LLP

(57) ABSTRACT

An image generating apparatus 10 acquires information associated with a motion of a head of a user wearing a head-mounted display 100. For a period of time for which the head is stopped, the image generating apparatus 10 generates a display image 70 with a standard resolution, and transmits the display image 70 to the head-mounted display 100, so that display images 71 having the same resolution are displayed. For a period of time for which the head is moved, the image generating apparatus 10 generates display images 72 each having the reduced resolution, and the head-mounted display 100 generates display images 73 obtained by enlarging the display images 72.

8 Claims, 11 Drawing Sheets

(58) Field of Classification Search
CPC ... G09G 2340/0414; G09G 2340/0421; G09G 2370/16; G09G 2340/0407; G09G 2354/00; G09G 3/002; G09G 5/00; G09G 5/36

See application file for complete search history.

(56) References Cited

U.S. PATENT DOCUMENTS

| | | | | |
|---|---|---|---|---|
| 2014/0123162 A1* | 5/2014 | Karlsson | ............ | H04N 21/8456 725/12 |
| 2014/0247277 A1* | 9/2014 | Guenter | ................. | G06T 11/40 345/611 |
| 2014/0361977 A1* | 12/2014 | Stafford | ................. | G06F 3/013 345/156 |
| 2016/0080645 A1* | 3/2016 | Ba | ....................... | H04N 13/398 348/207.11 |
| 2016/0170481 A1* | 6/2016 | Fateh | ................ | G02B 27/0176 345/174 |
| 2016/0260196 A1* | 9/2016 | Roimela | ................ | G06T 11/60 |
| 2016/0267716 A1* | 9/2016 | Patel | ....................... | G09G 5/373 |
| 2018/0096461 A1* | 4/2018 | Okayama | ................... | G06T 7/10 |
| 2018/0261003 A1* | 9/2018 | Peli | ........................ | G06T 15/08 |

FOREIGN PATENT DOCUMENTS

| | | |
|---|---|---|
| JP | 2016-527536 A | 9/2016 |
| JP | 2017069718 A | 4/2017 |
| WO | 2009/066465 A1 | 5/2009 |
| WO | 2009066465 A1 | 5/2009 |
| WO | 2014/197226 A1 | 12/2014 |
| WO | 2016/157677 A1 | 10/2016 |
| WO | 2016157677 A1 | 10/2016 |
| WO | WO-2016157677 A1 * 10/2016 ............... G06T 7/10 |

OTHER PUBLICATIONS

Natasa Vujko Muzdalo, "The Importance of Measuring Dynamic Visual Acuity," Coll. Antropl. 37(2013) Suppl. 1, p. 275-285.
Joseph S. Lappin, et al. "Spatial and temporal limits of motion perception across variations in speed, eccentricity, and low vision," Jornal of Vision, 2009, 9(1), 30, p. 1-14.
Notice of Reasons for Refusal dated Jul. 14, 2020, from JP Application No. 2019-518707, 3 sheets.
International Preliminary Report on Patentability dated Nov. 28, 2019, from International Application No. PCT/JP2017/018736, 14 sheets.

* cited by examiner

IMAGE GENERATING APPARATUS, METHOD, AND PROGRAM FOR DISPLAYING IMAGE RESOLUTION WITH MOTION IN HEAD-MOUNTED DISPLAY (HMD)

TECHNICAL FIELD

The present invention relates to an image displaying technology using a head-mounted display.

BACKGROUND ART

An image displaying system with which a target space can be appreciated from a free viewpoint is popular. For example, there is being developed a system with which a panorama video is displayed on a head-mounted display, and when a user wearing the head-mounted display rotates his/her head, a panorama image corresponding to a direction of a line of sight is displayed. The head-mounted display is utilized, resulting in that a sense of immersion in the video can be enhanced, and the operability of an application such as a game can also be enhanced. In addition, there is also developed a walk-through system with which the user wearing the head-mounted display physically moves, so that the user can virtually walk around within the space displayed as a video.

SUMMARY

Technical Problems

For the purpose of enhancing a you-are-there feeling with the technology as described above, it is requested that a high-definition image is displayed at a high-frame rate. As a result, an amount of data transmission between an apparatus sending a display image and the head-mounted display has a tendency to be increased. On the other hand, in order that the user wearing the head-mounted display may freely move around in the visual space, it is desired to unwire the communication between the apparatus sending the display image and the head-mounted display.

However, in the case where the communication is unwired, an increase in amount of data transmission leads to an increase in power consumption. Thus, it is necessary to take measures such as making capacity of a battery on the head-mounted display side large. As a result, it is considered that the head-mounted display increases in weight and generates the heat to injure a sense of use. In addition, when the data size is increased, the possibility that the delay occurs in display or the transmission fails is increased resulting from a transmission band which can be secured, the state of the communication, or the like.

The present invention has been made in the light of such a problem, and it is therefore desirable to present a technology which can satisfy both of high quality image expression and an improvement of a sense of use of a head-mounted display.

Solution to Problems

A certain aspect of the present invention relates to an image generating apparatus. The image generating apparatus includes: a motion detecting section acquiring information associated with a motion of a head of a user wearing a head-mounted display and deciding presence or absence of the motion; a resolution controlling section performing setting in which a resolution of at least a part of a display image is more reduced when there is a motion of the head than when there is no motion of the head; an image generating section generating a display image with a resolution following the setting; and an output section outputting data associated with the display image to the head-mounted display.

Another aspect of the present invention relates to an image displaying system. The image displaying system includes a head-mounted display and an image generating apparatus generating an image to be displayed on the head-mounted display. The image generating apparatus includes a motion detecting section acquiring information associated with a motion of a head of a user wearing a head-mounted display and deciding presence or absence of the motion, a resolution controlling section performing setting in which a resolution of at least a part of a display image is more reduced when there is a motion of the head than when there is no motion of the head, an image generating section generating a display image with a resolution following the setting, and an output section outputting data associated with the display image to the head-mounted display. The head-mounted display includes an image forming section enlarging the data associated with the display image having a reduced resolution and outputted from the image generating apparatus and causing the enlarged data to be displayed.

Still another aspect of the present invention relates to an image generating method. The image generating method includes the steps of: acquiring information associated with a motion of a head of a user wearing a head-mounted display and deciding presence or absence of the motion; performing setting in which a resolution of at least a part of a display image is more reduced when there is a motion of the head than when there is no motion of the head; generating a display image with a resolution following the setting; and outputting data associated with the display image to the head-mounted display.

It should be noted that an arbitrary combination of the constituent elements described above, and aspects obtained by converting the expression of the present invention with a method, an apparatus, a system, a computer program, a recording media in which a computer program is recorded, or the like are also effective as aspects of the present invention.

Advantageous Effect of Invention

According to the present invention, the high-quality image expression by the head-mounted display can be realized with a comfortable feeling of use.

DESCRIPTION OF EMBODIMENTS

Embodiment 1

Figure 1:
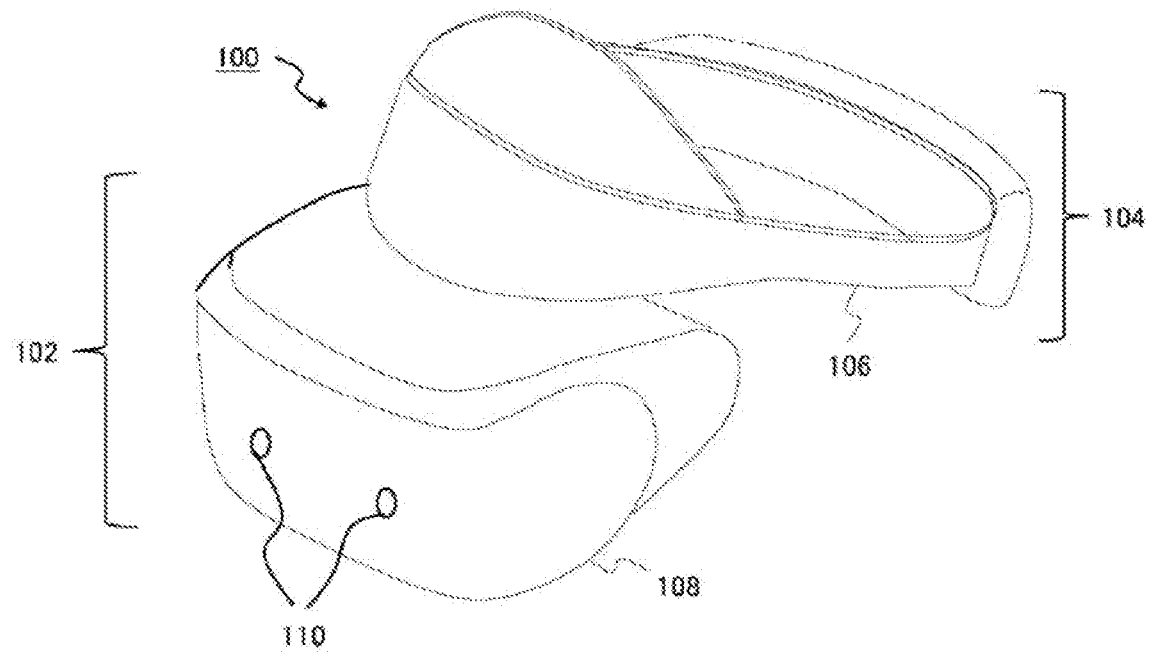
FIG. 1 is a perspective view depicting an example of external appearance of a head-mounted display in Embodiment 1.

FIG. 1 depicts an example of external appearance of a head-mounted display in Embodiment 1. In this example, a head-mounted display 100 includes an output mechanism section 102 and a wearing mechanism section 104. The wearing mechanism section 104 includes a wearing band 106 which makes a round of the head to realize fixing of the apparatus.

The output mechanism section 102 includes a chassis 108 having such a shape as to cover left and right eyes in a state in which the user wears the head-mounted display 100, and includes inside thereof a display panel so as to confront the eyes at the time of wearing. An inside of the chassis 108 may further include lens which is located between the display panel and the eyes of the user at the time of wearing of the head-mounted display 100 to enlarge a viewing angle of the user. Stereo images corresponding to a binocular parallax of the both eyes are displayed on areas into which the display panel is divided left and right, thereby realizing a stereo vision.

The head-mounted display 100 may further include a speaker or an earphone in a position corresponding to the ear of the user at the time of wearing. In this example, the head-mounted display 100 includes stereo cameras 110 in the front face of the chassis 108, and photographs a circumferential real space in the form of a moving image in a field of view corresponding to a line of sight of the user. Moreover, the head-mounted display 100 may include any of various kinds of sensors, for deriving a motion, a posture, a position, and the like of the head-mounted display 100, such as an acceleration sensor, a gyro sensor, a geomagnetic sensor, and a graphics processing unit (GPU) in the inside or the outside of the chassis 108.

Figure 2:
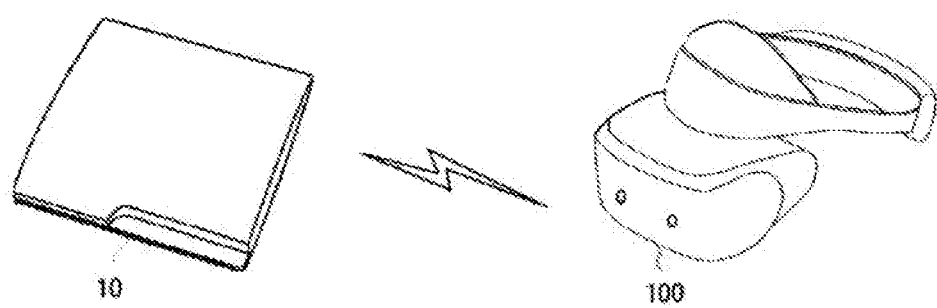
FIG. 2 is a view depicting an example of a configuration of an image displaying system in Embodiment 1.

FIG. 2 depicts an example of a configuration of an image displaying system of Embodiment 1. The head-mounted display 100 is connected to the image generating apparatus 10 in a wireless communication manner. However, wired connection by using a universal serial bus (USB) may also be adopted. The image generating apparatus 10 may be further connected to a server via a network. In this case, the server may provide an on-line application such as a game in which a plurality of users can participate via a network to the image generating apparatus 10.

The image generating apparatus 10 specifies the position of the point of view and the direction of the line of sight on the basis of the position and posture of the head of the user who wears the head-mounted display 100, generates the display image in the field of view corresponding to the specification result, and outputs the display image to the head-mounted display 100. Here, the contents of the output data are not especially limited and thus may adopt various forms depending on the function which the user requests for the system, the contents of the activated application, and the like.

For example, the image generating apparatus 10 may perform some sort of processing for the image photographed with the stereo camera 110 of the head-mounted display 100, or may make progress for the electronic game to generate the game picture. As such typical forms, there are given virtual reality (VR), and augmented reality (AR). Alternatively, a virtual world in which all constituent elements are constituted by virtual objects may be built, and the virtual world may be drawn in the field of view corresponding to the position of the point of view and the direction of the line of sight in the user.

In order to specify the position and posture of the head used in generation of the display image, the image generating apparatus 10 analyzes the image photographed with the head-mounted display 100 by using an existing technology such as simultaneous localization and mapping (SLAM). Alternatively, the image generating apparatus 10 acquires the posture, the motion, and the position of the head from measured values obtained from the sensors which the head-mounted display 100 includes. These processing results may be integrated to increase the accuracy.

In such an image displaying system, for a period of time for which the head of the user is moved, the image generating apparatus 10 reduces the resolution of at least a part of the display image to reduce an amount of data transmission, thereby suppressing the power consumption. Since when the human moves his/her head, the circumferential thing is relatively moved, a similar situation to that in which a moving body is seen is obtained. Here, it is known that the dynamic visual acuity of the human is a fraction of a static visual acuity of the human when the stopped thing is seen (e.g., refer to Muzdalo, "The Importance of Measuring Dynamic Visual Acuity," Coll. Antropl. 37(2013) Suppl. 1, p. 275-285). In other words, in the actual world, for a period of time for which the head is moved, the eyesight of the human shall be lowered.

On the other hand, since in case of the head-mounted display, the display panel is moved together with the head, even in a thing which is expressed as if it was far, there is no change in the visibility of the thing, and detailed information actually, continuously reaches the eyeballs. For this reason, in the general display processing, the divergence from the change in visibility in the actual world can be caused. The resolution is reduced for a period of time for which the head is moved as described above, resulting in that rather, the image expression close to the case where the actual world is seen can be realized. As a result, the image expression closer to the reality can be attained together with the effect that the amount of data transmission or the power consumption can be reduced.

Figure 3:
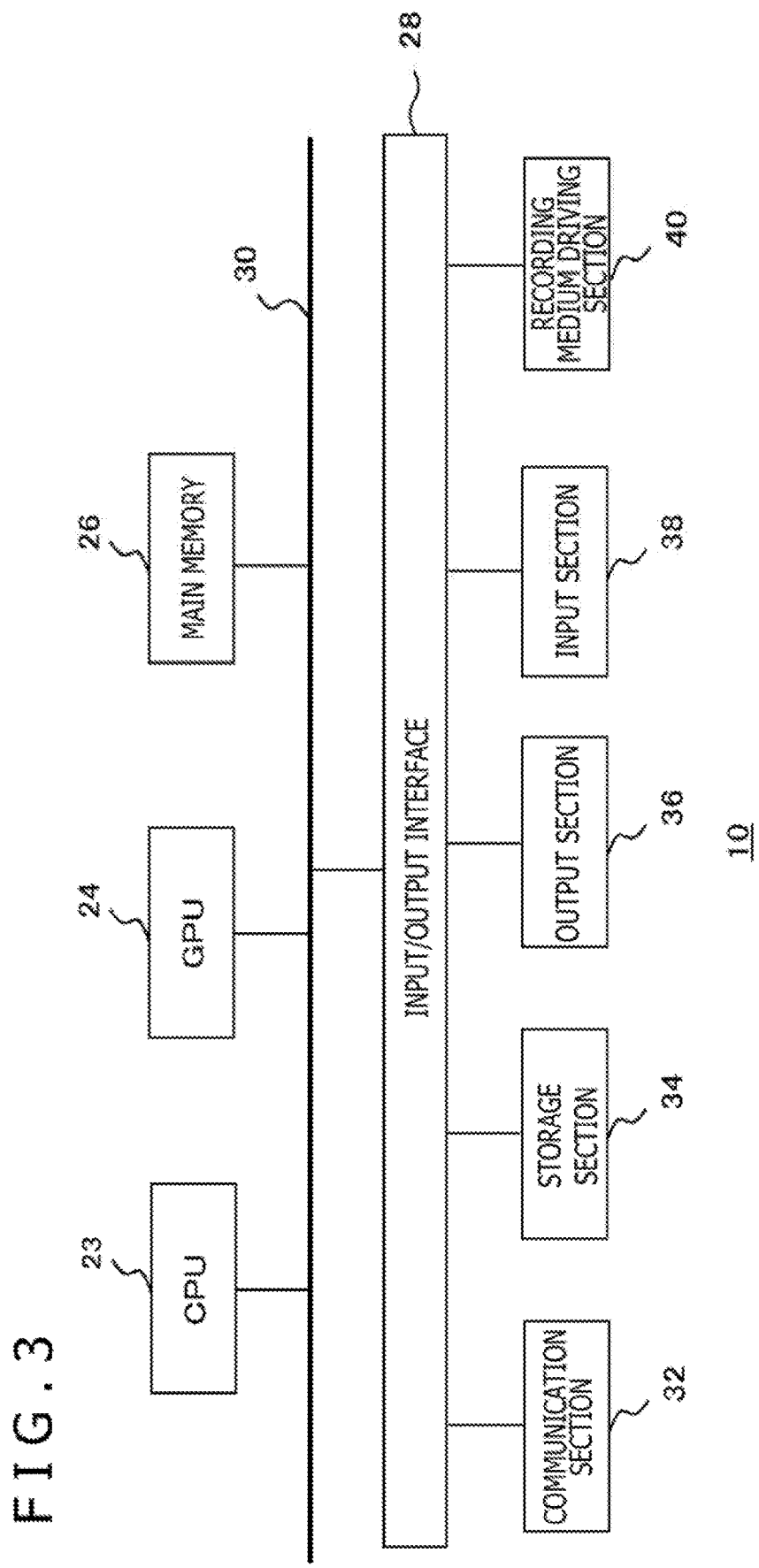
FIG. 3 is a circuit diagram depicting a configuration of an internal circuit of an image generating apparatus in Embodiment 1.

FIG. 3 depicts a configuration of an internal circuit of the image generating apparatus 10. The image generating apparatus 10 includes a central processing unit (CPU) 23, a GPU 24, and a main memory 26. These sections are connected to one another via a bus 30. An input/output interface 28 is further connected to the bus 30. A communication section 32 which includes a peripheral device interface such as a USB or an IEEE 1394, or a network interface of a wired or wireless local area network (LAN), and which establishes communication with the head-mounted display 100, a storage section 34 such as a hard disc drive or a non-volatile memory, and an output section 36 which outputs the data to the head-mounted display 100 are connected to the input/output interface 28. In addition, an input section 38 which receives as input thereof data from the head-mounted display 100 or an input device (not depicted), and a recording medium driving section 40 which drives a removable recording medium such as a magnetic disc, an optical disc or a semiconductor memory are also connected to the input/output interface 28.

The CPU 23 executes an operating system stored in the storage section 34, thereby controlling the entire image generating apparatus 10. The CPU 23 also executes various kinds of programs which are read out from the CPU 23 or a removable recording medium to be loaded into the main memory 26, or down-loaded via the communication section 32. The GPU 24 has a function of a geometry engine and a function of a rendering processor, executes drawing processing in accordance with a drawing instruction issued from the CPU 23, and outputs the execution result to the output section 36. The main memory 26 is constituted by a random access memory (RAM), and stores therein a program or data necessary for the processing.

Figure 4:
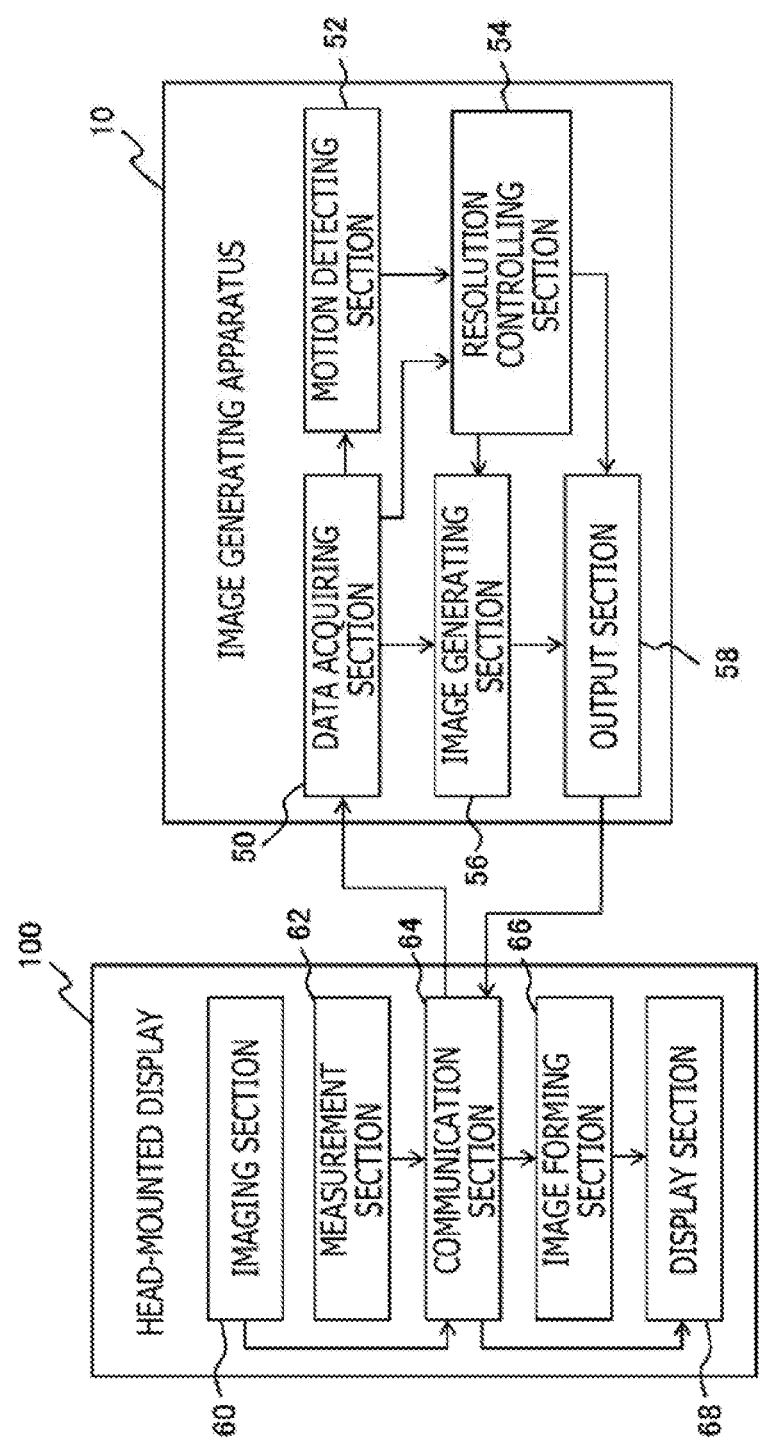
FIG. 4 is a block diagram depicting a configuration of a functional block of an image generating apparatus and the head-mounted display in Embodiment 1.

FIG. 4 depicts a configuration of functional blocks of the image generating apparatus 10 and the head-mounted display 100. The functional blocks of FIG. 4 and FIG. 9 which will be described later, in terms of hardware, can be realized by the various kinds of circuits depicted in FIG. 3, the stereo camera 110 depicted in FIG. 1, various kinds of sensors, a display panel, a microprocessor, a memory (each not depicted), and the like, and in terms of software, can be realized by a program which fulfills various functions such as an image analyzing function, an information processing function, an image drawing function, a data input/output function, and a communication function which are loaded from a recording medium into a memory. Therefore, it is understood by a person skilled in the art that these functional blocks can be realized in various forms by only the hardware, only the software, or a combination thereof, and the present invention is by no means limited to any of these forms.

The image generating apparatus 10 includes a data acquiring section 50, a motion detecting section 52, a resolution controlling section 54, an image generating section 56, and an output section 58. The data acquiring section 50 acquires data necessary for the processing from the head-mounted display 100. The motion detecting section 52 specifies presence or absence of the motion of the head of the user. The resolution controlling section 54 sets a resolution of a display image in response to presence or absence of the motion of the head. The image generating section 56 generates a display image with the decided resolution. In addition, the output section 58 suitably shapes the data associated with the display image and outputs the resulting data to the head-mounted display 100.

The data acquiring section 50 acquires at least any one of the photographed image and the measured values of the sensors from the head-mounted display 100 at a predetermined rate. The kind of data acquired is variously considered depending on the contents of the display image, information associated with a point of view of the user, a kind of data used to specify the motion of the head, or the like. For example, in the form in which the photographed image is processed to generate the display image, and the motion of the head is acquired only from the image analysis, only the data associated with the photographed image may be acquired.

In the form in which the entire display image is generated by the drawing of the virtual object, and the point of view and the motion of the head of the user are obtained from the measured values of the sensors, only the measured values of the sensors may be acquired. Needless to say, the data associated with both the photographed image and the sensor measurement values may be acquired, the photographed image may be used in the display image, or the information associated with a point of view or the motion of the head may be acquired from the photographed image or the measured value from the motion sensor.

The motion detecting section 52 specifies whether or not the head is moved by using at least any one of the photographed image and the measured value from the motion sensor. For example, the motion detecting section 52 obtains an angle of rotation and a translation amount of the head at a predetermined rate, and decides that the head is moved when one of them is equal to or larger than a threshold value, while it decides that the head is stopped when one of them is smaller than the threshold value.

For a period of time for which it is decided that there is a motion of the head, the resolution controlling section 54 performs the setting in which the resolution of at least a part of the display image is reduced. Most simply, the resolution of the entire image is set lower than that in the case where there is no motion of the head. As described above, it is known that the dynamic visual acuity of the human is a fraction of a static visual acuity of the human. For example, when it is supposed that the dynamic visual acuity becomes ⅔ times smaller than the static visual acuity, and ⅔ times is converted into the pixels of the display image, 100 rows of pixels shall be visually recognized with the resolution of approximately 67 rows.

Therefore, even if the resolution is vertically and horizontally reduced to ⅔ times, the possibility that such a change is visually recognized is low. By adopting such a procedure, an amount of data becomes a half or less than of the original image, and the power consumption is largely reduced. However, it is not the main point that the reduction rate of the resolution is limited to ⅔ times, an appropriate value is obtained in the light of a usable transmission band, acceptable power consumption, and the like. The reduction rate of the resolution may be set to only one, or the resolution may be changed step by step corresponding to a range of the speed in such a way that when the motion of the head is slow, the reduction rate rate is suppressed, while the motion of the head is fast, the reduction rate is increased, and so forth.

In addition, the resolution controlling section 54 may divide the display image into areas, and may set different resolution in each of the areas. For example, the resolution of the image of the object at which the user gazes, or the area of a predetermined range from the gaze point may be made higher than that in any of the other areas. In this case, a general gaze point detector is provided in the head-mounted display 100, and information associated with the position coordinates of the gaze points of the left and right eyes for the display panel is caused to be transmitted at a predetermined rate. The data acquiring section 50 of the image generating apparatus 10 acquires the information of interest, and successively supplies the information of interest to the resolution controlling section 54.

An area in a certain range with the gaze point as a center is generally called "an effective field of view," and it is known that the effective field of view is visually recognized with a high eyesight as compared with "a peripheral visual field" of the periphery of the effective field of view. In the case where the point of view is determined on a certain thing even when the head is moved, since the relative motion of the thing with respect to the pupil is small, the visual recognition with the eyesight compatible with the effective field of view when the head is not moved can be performed. Therefore, with respect to the areas in the predetermined range including the gaze point, the resolution is maintained to some extent, so that the reduction of the resolution becomes harder to recognize. Incidentally, in the case where the photographed image is analyzed by using the SLAM, a relationship between the real object lying within the field of view and the direction of the line of sight is obtained as three-dimensional information. Therefore, a portion at which the user gazes may be specified on the basis of the result of interest, and the resolution of the area other than that portion in the image plane may be reduced.

In the form as well in which the area division is performed in such a manner to adjust the resolution, the setting of the resolution for each area may be changed depending on the range of the relative speed. For example, with respect to the area including the gaze point, the resolution may be set on the basis of the relative speed between the gaze point and the thing at which the user gazes, and with respect to the area other than the area including the gaze point, the resolution may be set on the basis of the speed of the head. In addition, the boundary between the areas may be changed depending on the speed of the head. In other words, when the speed is low, the resolution is maintained in the area of the relatively wide range from the gaze point, and as the speed becomes higher, such an area is narrowed, and thus the area of the low resolution is widened.

The boundary may be changed depending on the speed in such a manner, and the resolution of each of the areas may be changed. It should be noted that the number of areas for which the resolutions are made to differ is by no means limited to two, and three or more areas may also be available. For example, the concentric circles having different radiuses with the gaze point as a center may be made the boundaries, and in this state, the areas may be formed. The resolution controlling section 54 executes the processing for setting the resolution at the predetermined rate corresponding to the motion of the head of the user, and supplies the processing result to the image generating section 56.

The image generating section 56 generates the display image with the resolution set by the resolution controlling section 54 at the frame rate for display. The contents of the generated image are various as described above. Thus, some sort of processing may be executed for the photographed image, or the virtual world may be drawn so as to correspond to the field of view of the user. The information associated with the point of view or the line of sight of the user necessary for the generation of the display image may be obtained on the basis of the measured values of the sensors which the image generating section 56 acquires from the data acquiring section 50, or may be obtained from the image analysis by the SLAM.

In the case where the image analysis by the SLAM is performed for performing the setting of the resolution in the resolution controlling section 54, the result of the image analysis can be shared. It should be noted that for giving a change to contents of the processing or the virtual world, the image generating section 56 may be made to simultaneously progress in information processing such as the electronic game. In this case, it is only necessary that the general information processing is executed on the basis of the motion of the object taken on the photographed image, the user operation for an input device (not depicted), or the like.

In the case where the input device is specially introduced, the data acquiring section 50 acquires the contents of the user operation from the input device of interest, and supplies the contents of the user operation to the image generating section 56. The image generating section 56 may make the photographed image the display image as it is in some cases. In any case, in accordance with the setting by the resolution controlling section 54, the image generating section 56 more reduces the resolution of at least a part of the area of the display image for a period of time for which the head of the user is moved than for a period of time for which the head of the user is not moved.

The existing technology such as bilinear interpolation can be used for the method of reducing the resolution. The output section 58 suitably shapes the data associated with the generated image and successively transmits the resulting data to the head-mounted display 100. For example, in the case where the stereo vision is realized, the stereo images of the left and right points of view which are generated by the image generating section 56 are arranged side by side to obtain the data for the final display.

In the case where the head-mounted display 100 has a form in which the displayed picture is seen through the lens, the correction in which the distortion by the lens is taken into consideration may be performed for the image of each of the points of view so that, in this state, the displayed portion can be properly seen. It should be noted that in the case where the data associated with the display image is compression-coded to be transmitted, the output section 58 may execute the processing for reducing the resolution as described above in the compression processing. For example, in a form in which the data is separated in the frequency band of the image to be transmitted, it is considered that the high-frequency component is excluded from the transmission target in accordance with the setting of the resolution by the resolution controlling section 54.

In addition, the output section adds the information associated with the resolution of the image as the transmission data, thereby enabling the display image having a size corresponding to the resolution of the display panel to be generated in the head-mounted display 100. For example, in the case where the resolutions of the entire image are uniformly reduced, the values of the resolutions associated with the frames of the display image is transmitted. In the case where the resolution is made to differ depending on the area, the data in which the area and the resolution are associated with each other is transmitted.

The head-mounted display 100 includes an imaging section 60, a measurement section 62, a communication section 64, an image forming section 66, and a display section 68. The imaging section 60 photographs the real space in the form of the moving image. The measurement section 62 measures the posture, the motion, the position, and the like of the head-mounted display 100. The communication section 64 establishes the communication with the image generating apparatus 10 and transmits/receives the data. The image forming section 66 sets the data associated with the display image and transmitted from the image generating apparatus 10 so as to have a final display format. The display section 68 displays thereon the image.

The imaging section 60 is realized in the form of a configuration of a general imaging apparatus such as the stereo camera 110 of FIG. 1 or a monocular camera and photographs the real space in the front of the user at a predetermined frame rate. The measurement section 62 includes at least any one of an acceleration sensor, a gyro sensor, a geomagnetic sensor, a GPU, and the like, and thus successively measures an acceleration or an angular velocity of the head-mounted display 100, that is, the head of the user wearing the head-mounted display 100. These elements may be combined with each other to configure an inertial measurement apparatus, and may enable the angle, the speed and the position to be derived.

It should be noted that it is sufficient that one of the imaging section 60 and the measurement section 62 functions depending on the data necessary for the image generating apparatus 10 as described above in some cases. Moreover, a gaze point detector may be introduced to the measurement section 62 in order to derive the position coordinates of the gaze point in the display panel. The communication section 64 successively transmits at least any one of the photographed images obtained from the imaging section 60 and the measured value from the measurement section 62 to the image generating apparatus 10. The communication section 64 further receives the data associated with the display image transmitted from the image generating apparatus 10. The image forming section 66 acquires the data associated with the display image from the communication section 64, and shapes the data associated with the display image into the final display format.

In other words, the image forming section 66 specifies the resolution of the display image transmitted on the basis of the additional data and performs the interpolation processing for matching the resolution of the display image with the resolution of the display panel. In the case where the resolution is made to differ in each area, the pixels are interpolated so as for the image to be extended at suitable magnification in each area. Any of the general methods may be adapted for the interpolation processing. However, since the reduction rate of the resolution in Embodiment 1 is suppressed such that the visual recognition is not influenced on the basis of the reduction of the eyesight of the human for the moving body, even the relatively simple method is permissible.

As a result, the time necessary for the interpolation processing can be shortened and the latency up to the display can be suppressed. Incidentally, when the display image transmitted from the image generating apparatus 10 has the low resolution and the size of the image is small, the image forming section 66 may interpolate the pixels so as to match the resolution of the display panel as described above, thereby enlarging the image. Alternatively, while the size of the display image transmitted is held as it is, a black area may be provided in the periphery, thereby matching the size of the display panel. The display section 68 includes the display panel, a drive circuit thereof, and the like, and presents the final display image to the front of the eyes of the user. It should be noted that in the case where the head is not moved and it is unnecessary to adjust the resolution of the image transmitted from the image generating apparatus 10, the data may be directly supplied from the communication section 64 to the display section 68.

Figure 5:
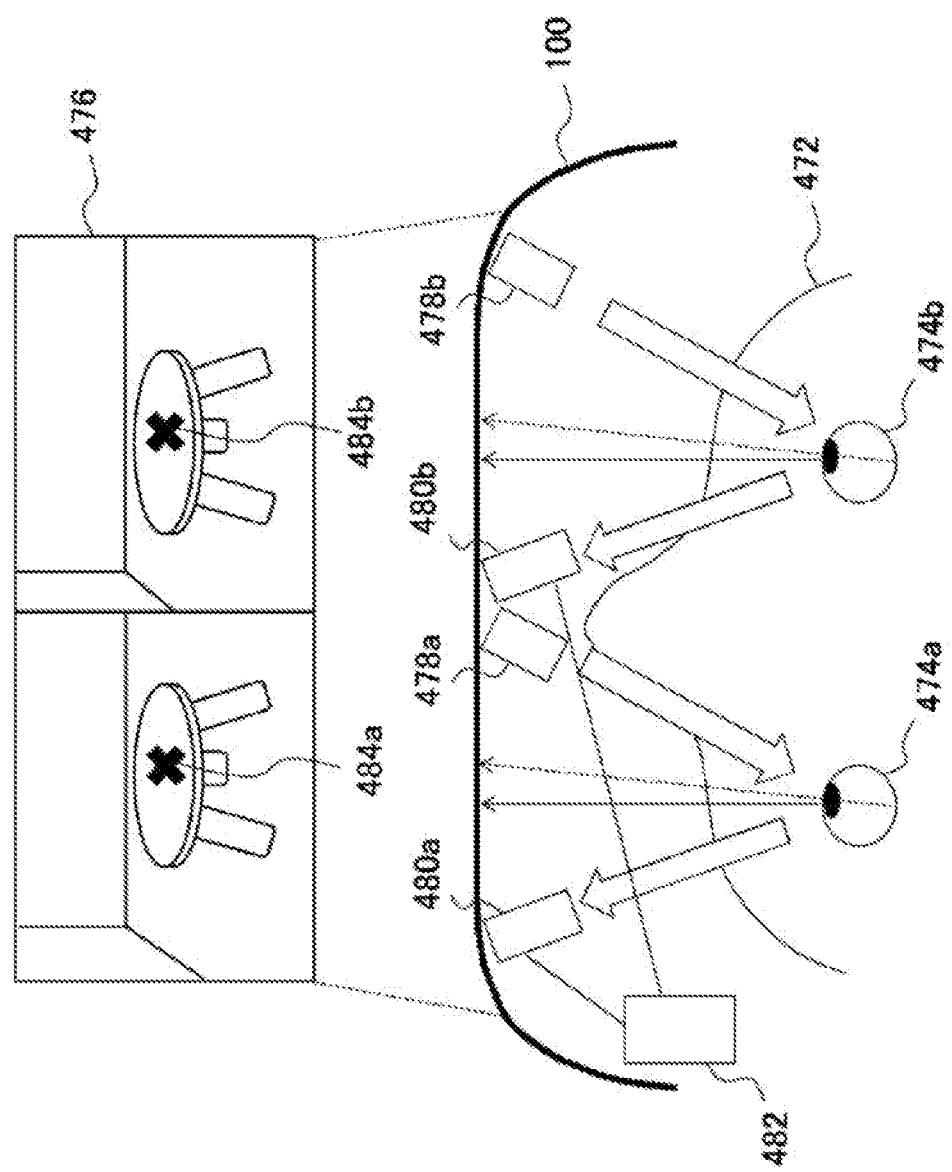
FIG. 5 is a view depicting an example of a configuration in the case where a gaze point detector is introduced to the head-mounted display in Embodiment 1.

FIG. 5 depicts an example of a configuration in the case where the gaze point detector is introduced to the head-mounted display 100. A lower stage of the figure schematically represents a situation in which the head-mounted display 100 and a head 472 of the user wearing the head-mounted display 100 are viewed from above. Display images 476 as depicted in an upper stage of the figure are displayed on the head-mounted display 100, and the user sees the display images with his/her left and right eyes 474*a* and 474*b*, respectively. Here, infrared light emitting diodes (LEDs) 478*a* and 478*b*, infrared cameras or position sensitive detector (PSD) sensors 480*a* and 480*b*, and the image analyzing apparatus 482 are provided as the gaze point detector.

The infrared LEDs 478*a* and 478*b* irradiate infrared rays to the left and right eyes 474*a* and 474*b* of the user, respectively. The infrared cameras or PSD sensors 480*a* and 480*b* photograph the left and right eyes 474*a* and 474*b* of the user, respectively, and supply the resulting data to the image analyzing apparatus 482. The image analyzing apparatus 482 specifies a reflection position of the infrared rays and a position of the pupil in a cornea from the photographed images of the left and right eyes, and specifies the line of sight of the user from the positional relationship therebetween. This method is put in practical use as the corneal reflex method in the field of a line-of-sight detecting technology. Incidentally, the method for detecting the line of sight is by no means limited thereto, and any of the general methods such as the technology for, for example, photographing the left and right eyes with a visible light camera and specifying the line of sight from a positional relationship between an inner corner of the user's eye and irises of them may be adopted.

The image analyzing apparatus 482 analyzes intersection points 484*a* and 484*b*, as the gaze points, between the lines of sight detected in such a way and the display panel on which the display image 476 is displayed of the user to detect position coordinates. The information associated with the position coordinates of the gaze points of interest is transmitted to the image generating apparatus 10 and is received by the data acquiring section 50 of the image generating apparatus 10. After the resolution controlling section 54 divides the image plane into the areas on the basis of the gaze points, the resolution controlling section 54 sets the resolutions to the respective areas.

Figure 6:
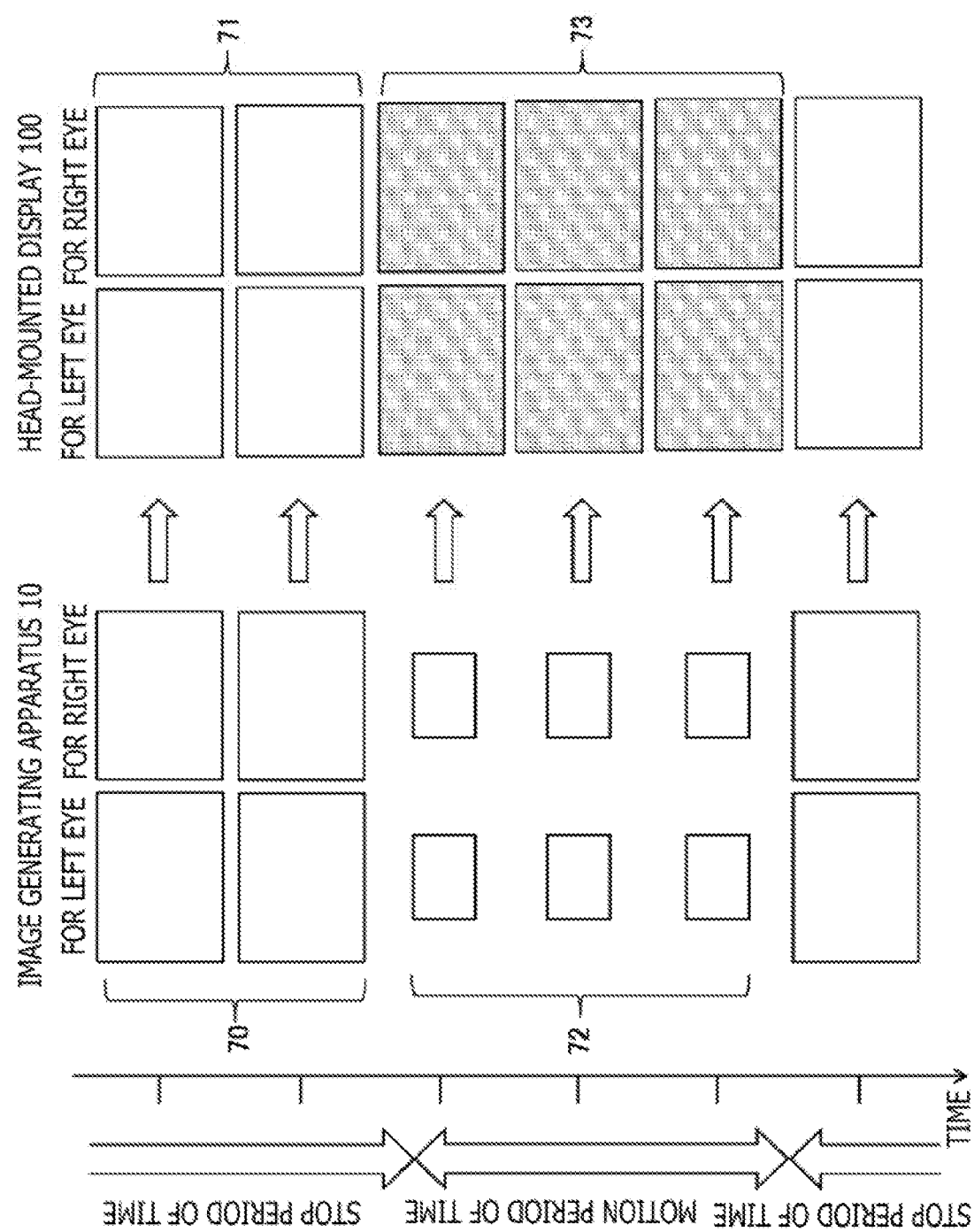
FIG. 6 is a view schematically depicting a temporal change of a frame constituting a display image in Embodiment 1.

FIG. 6 schematically depicts a temporal change of the frame constituting the display image. A longitudinal direction of the figure represents time, and represents an image frame which is generated/displayed in time steps as the display image in the form of a rectangular shape. In this example, it is supposed that the image for the left eye, and the image for the right eye are generated/displayed, thereby realizing the stereo vision. However, it is not the main point that the stereo vision is essential. Firstly, for "a stop period of time" for which there is no motion of the head, the image generating apparatus 10 generates the display image 70 with the resolution corresponding to the display resolution of the head-mounted display. As a result, the generated display image is displayed on the head-mounted display 100 as it is (a display image 71).

Then, after the operation proceeds to "a motion period of time" for which the head is decided to be moved, the image generating apparatus 10 reduces the resolution, thereby generating a display image 72 which is smaller in size than that for the stop period of time. In the head-mounted display 100, the display image 72 is enlarged to be displayed. As a result, in a displayed image 74, high-frequency components become less than those in the original image. In the figure, this state is exhibited with hatching. Alternatively, the black area may be provided in the periphery as described above, thereby obtaining a display image the size of which matches the size of the display panel. Then, when the head is stopped again, the image generating apparatus 10 returns the resolution of the display image back to the original one, and in the head-mounted display 100, the transmitted image is displayed as it is.

Figure 7:
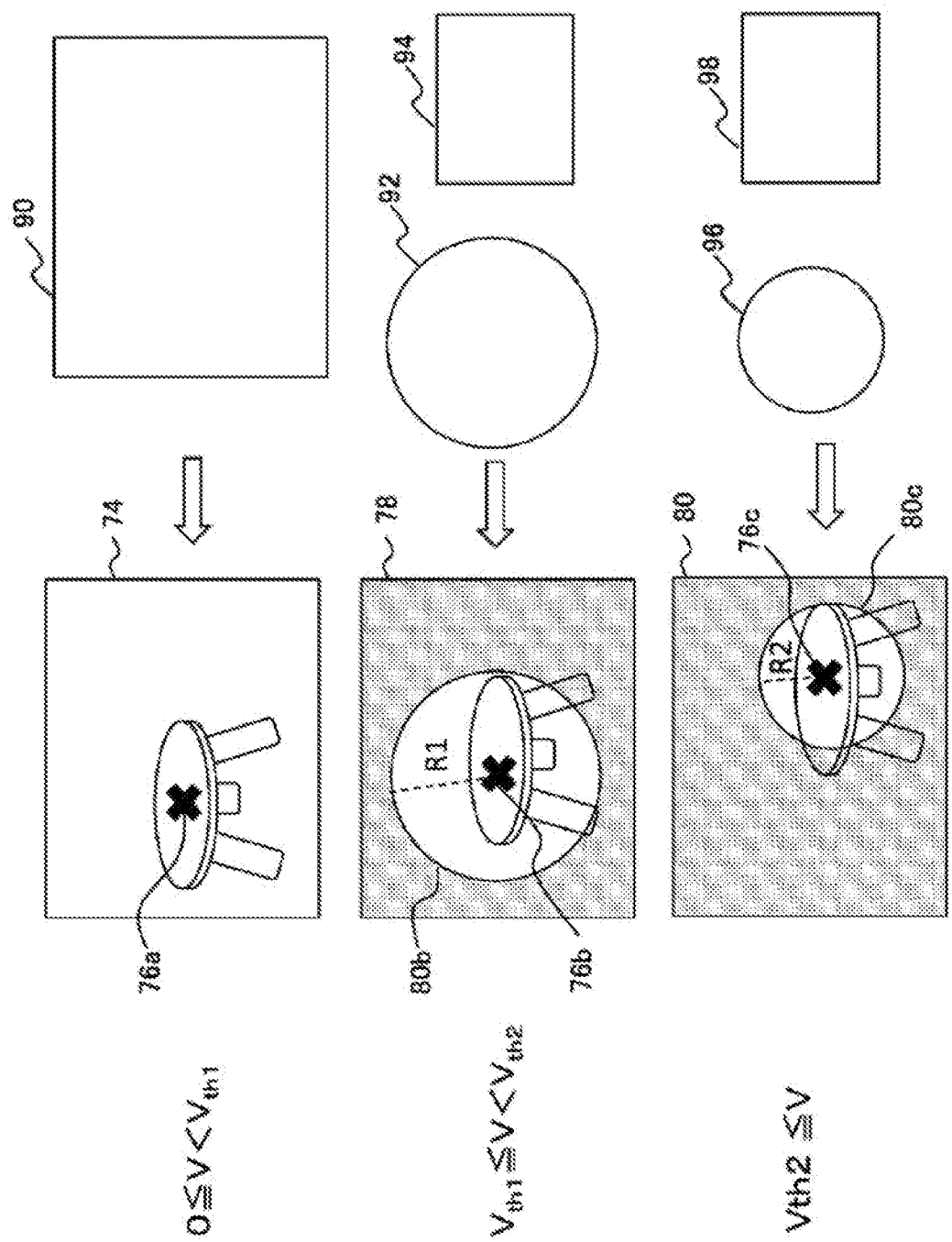
FIG. 7 is a view schematically depicting an example of a relationship between a speed of a motion of a head and an area in the case where a resolution is caused to differ depending on the area in Embodiment 1.

FIG. 7 schematically depicts an example of a relationship between the speed of the motion of the head and the area in the case where the resolution is made to differ depending on the area. It should be noted that although the display image may be actually the stereo images as depicted in FIG. 6, the figure depicted only one of the stereo images. In addition, the area in which the resolution is reduced is exhibited with the hatching. Moreover, on the right side of each of the display images, the data associated with the image transmitted from the image generating apparatus 10 is depicted in the form of a figure representing the shape and size thereof in order to display the display image of interest.

Firstly, if an upper limit speed at which it is regarded as that there is no motion of the head is set as a first threshold value $V_{th1}$, then, when the actual speed falls within a range of $0 \leq V < V_{th1}$, the entire image has a standard resolution irrespective of the position of the gaze point 76a like the image 74. Here, the standard resolution, for example, is the same resolution as the display resolution of the head-mounted display 100. At this time, the image generating apparatus 10 transmits the data associated with an image 90 representing the entire display image with a size corresponding to the standard resolution.

On the other hand, if an upper limit speed in which although the head is moved, the speed is regarded as a low speed is set as a second threshold value $V_{th2}$ ($V_{th2} > V_{th1}$), then, when the actual motion V falls within a range of $V_{th1} \leq V < V_{th2}$, a gaze area 80b with the gaze point 76b as a center has the standard resolution, and the resolution of the area of the outside of the gaze area 80b is reduced like an image 78. In the depicted example, the gaze area 80b has a circular shape with a radius of R1. At this time, the image generating apparatus 10 transmits the data associated with an image 92 representing only the gaze area 80b with the standard resolution, and the data associated with an image 94 representing the entire display image with a size smaller than standard one and corresponding to the reduced resolution.

It should be noted that the image 92 of the gaze area 80b which the image generating apparatus 10 transmits actually may be a rectangle in shape circumscribing the gaze area 80b. Alternatively, the gaze area 80b itself may have the rectangular shape. After the image forming section 66 of the head-mounted display 100 enlarges the image 94 of the entire area having the small size, the image forming section 66 synthesizes the image 94 with the image 92 of the gaze area 80b, thereby generating the image 78. At this time, the boundary portion is desirably subjected to the alpha blend synthesis so that the image of the gaze area 80b is smoothly connected to the area of the outside of the image of the gaze area 80b.

In the range of $V_{th2} \leq V$ in which the motion can be regarded as the high speed, like the image 80, the gaze area 80c with the gaze point 76c as the center is caused to have the standard resolution, and the resolution of the area of the outside of the gaze area 80c is reduced. Here, the size of the gaze area 80c is made smaller than that of the gaze area 80b in the image 78 at the time of the low speed. In the depicted example, the gaze area 80c has a circular shape having a radius of R2 (R2<R1). At this time, the image generating apparatus 10 transmits the data associated with an image 96 representing only the gaze area 80c with the standard resolution and the data associated with an image 98 representing the entire display image with a size smaller than standard one and corresponding to the reduced resolution. The image 96 of the gaze area at the time of the high speed becomes smaller in size than the image 92 at the time of the low speed.

In addition, the entire image 98 at the time of the high speed may be made to have a size smaller than that of the entire image 94 at the time of the low speed, or may be made to have the same size as that of the entire image 94 at the time of the low speed. It should be noted that although in this example, two threshold values are set for the motion speed, three or more threshold values may be set for the motion speed, or one threshold value may be set for the motion speed. In addition, as described above, a plurality of stages of boundaries may be set corresponding to the distance from the gaze point, thereby causing the resolution to differ in three or more areas. Moreover, the reduction rate of the resolution in each of the areas may be changed corresponding to the speed range.

Qualitatively, as the speed becomes higher, the area in which the resolution is reduced is expanded. As a result, as the speed becomes higher, the size of the data to be transmitted can be reduced. On the other hand, in the case where the resolution is maintained for the object at which the user gazes, whereby in the case where the user is moving in a state in which the user gazes at a certain thing, the fineness can be prevented from being reduced even for a thing at which the user gazes to give a sense of discomfort to the user. In addition, the area having the high resolution can be narrowed on the basis of the fact that in terms of the characteristics of the human, as the motion becomes faster, the effective field of view is narrowed, thereby enabling an amount of data to be reduced by the more natural change to fullest.

The form as depicted further has the following effects. In other words, it is understood that as the characteristics of the human, the peripheral field of view is high in recognition ability for the motion as compared with the effective field of view of the periphery of the gaze point (e.g., refer to Joseph S. Lappin, et al. "Spatial and temporal limits of motion perception across variations in speed, eccentricity, and low vision," Journal of Vision, 2009, 9(1), 30, p. 1-14). In the head-mounted display, unlike the actual field of view, even when the head is moved, the fine image is presented to the peripheral field of view, which can give an excessive stimulation to the inside of the brain due to the synergetic effect with the high recognition ability in some cases. Like Embodiment 1, when the resolution of the periphery dares to reduce, thereby reducing an amount of information of the peripheral field of view which is easy to become the relatively large motion, the display form in which the sickness or the eye strain is hard to cause can be realized.

Incidentally, although in the depicted example, in the state in which there is no motion of the head, the entire image 74 is made to have the standard resolution, in this stage, the area having the standard resolution and including the gaze point 76a, and the area having the low resolution in the outside of that area may constitute the display image. In this case, the area having the standard resolution is more narrowed in the period of time for which the head is moved than in the period of time for which the head is not moved. As described above, as compared with the effective field of view, the peripheral field of view is visually recognized in the low eyesight. In addition, in case of the head-mounted display 100 in which the field of view is enlarged with the lens, since in terms of the structure, the peripheral field of view is visually recognized with the rough resolution, the benefit of increasing the resolution of the display image is less. Therefore, even when there is no motion of the head, lowering the resolution of the peripheral area, resulting in that while the influence exerted on the visibility is suppressed, an amount of data transmission can be further reduced.

Moreover, although in the depicted example, the gaze areas 80b and 80c each having the standard resolution have the circular shape, it is not the main point to limit the shapes of the gaze areas 80b and 80c to the circular shapes, and the shapes of the gaze areas 80b and 80c may be made to have a rectangle or an ellipse with the gaze point as the center of gravity, or an area of the image of the object at which the user gazes, or the like. In addition, the position or shape of the area having the standard resolution may be adaptively changed corresponding to the direction in which the head is moved. In addition, instead of causing the resolution to differ between the gaze area and the area other than the gaze area, the resolution of the area for which the gazing is desired as the contents of the image may be made higher than that of the other area. For example, in terms of the contents of the game, the resolutions of the area in which the important object is represented, the area in the direction of travel of the user in the virtual world, the central area of the field of view, and the like may be made high.

Alternatively, in the situation in which the user operation is received via the input device (not depicted), the area in which the resolution is made high may be decide depending on the object which is the target of the operation of interest, or the operation contents. In addition, when the resolution is reduced, the resolutions of the areas are decided so that a bit rate of the transmission data becomes a predetermined value. In other words, a combination of an area of the area such as the gaze area in which the resolution is made higher than that of other areas, and the resolution which is set in the area of interest and the other areas is suitably decided so that an amount of data associated with the entire image falls within the predetermined value.

Figure 8:
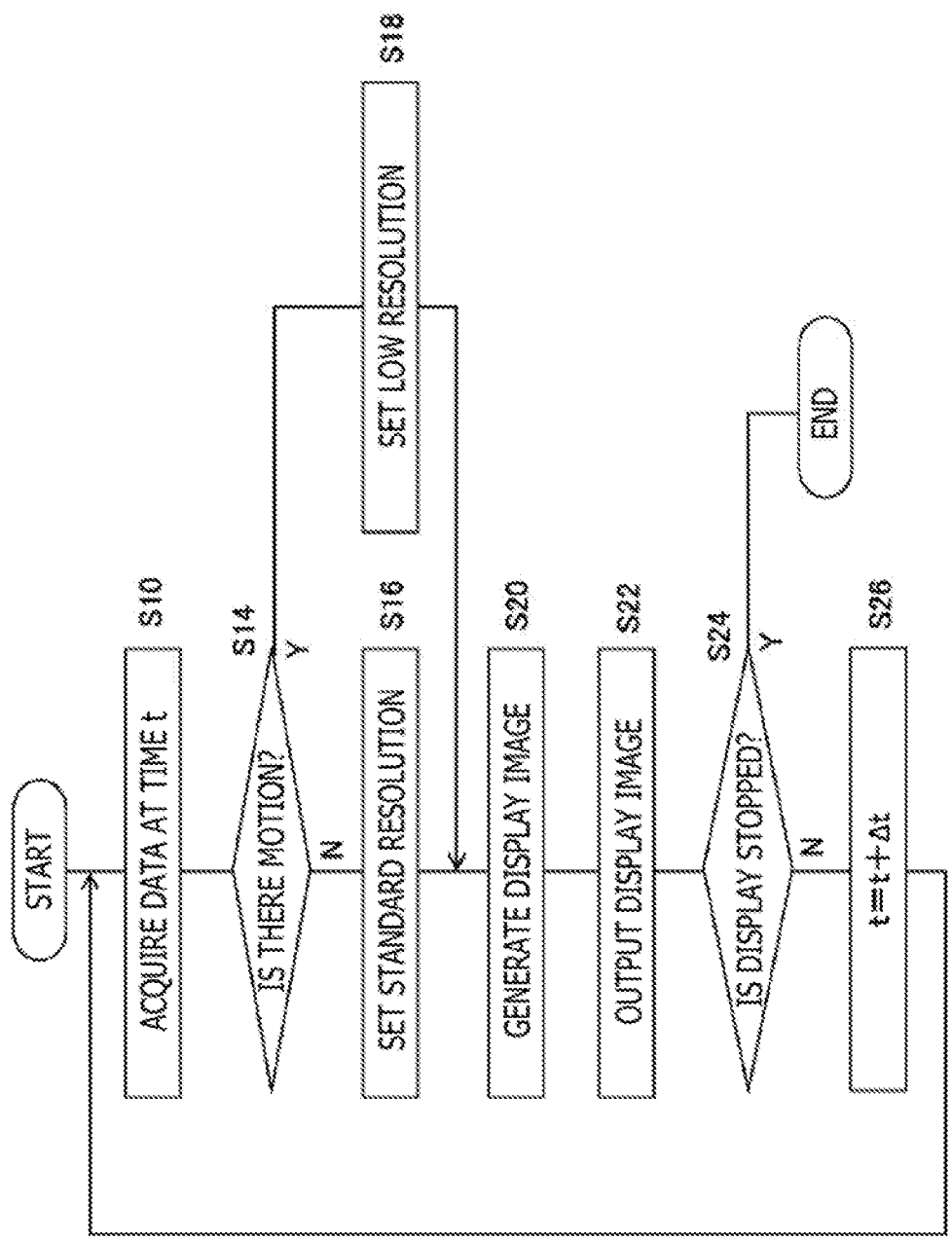
FIG. 8 is a flow chart depicting a procedure for generating and outputting a display image with a resolution corresponding to the motion of the head of the user by the image generating apparatus in Embodiment 1.

Next, a description will be given with respect to the operation of the image generating apparatus 10 which can be realized by the configuration described until now. FIG. 8 is a flow chart depicting a procedure for generating and outputting the display image with the resolution corresponding to the motion of the head of the user by the image generating apparatus 10. This flow chart is started by, after the user wears the head-mounted display 100, inputting a request to start the electronic content following the image display for the head-mounted display 100, and so forth. In response to this operation, in the head-mounted display 100, the measurement with the photographing, or various kinds of sensors is started. Moreover, the measurement of the position coordinates of the gaze point may be started with the gaze point detector.

Firstly, the data acquiring section 50 of the image generating apparatus 10 acquires at least any one of the data associated with the photographed image and the sensor measurement values at current time t from the head-mounted display 100 (S10). At this time, the position coordinates of the gaze point at the time t is acquired if necessary. Then, the motion detecting section 52 analyzes those to decide whether or not there is a motion of the head (S14). Actually, as described above, it is decided whether or not the angular velocity or the translation velocity of the head exceeds the predetermined threshold value (in the above example, the first threshold value $V_{th1}$).

In the case where it is decided that there is no motion of the head, the resolution controlling section 54 causes the setting of the resolution at the time t to be the standard and notifies the image generating section 56 of this effect (N in S14, S16). As described above, even in the standard state, the resolution of the outside of the area of the predetermined range including the gaze point may be reduced to suppress the amount of transmission data. In the case where it is decided that there is a motion of the head, the resolution controlling section 54 makes such setting as to reduce the resolution of the at least a part of the display image and notifies the image generating section 56 of the effect (Y in S14, S18).

At this time, as described above, by performing the decision using still another threshold value, the reduction rate of the resolution, or the area of the area to be reduced may be adjusted depending on the speed range. The image generating section 56 generates the display image having the field of view corresponding to the line of sight of the user at the time t with the resolution following these settings (S20). The image generating section 56 further creates, as additional data, information associated with the resolution of the generated display image and information in which the area and the resolution are associated with each other.

The output section 58 suitably subjects the data associated with the generated display image to the shaping, the compression-coding, and the like, and transmits the resulting data together with the additional data to the head-mounted display 100 (S22). In the case where it is decided in S14 that there is a motion of the head, the resolution may be substantially reduced by using a method of excluding the high-frequency components from the transmission target in the compression processing of S22, and so forth. For a period of time for which there is not caused the necessity for ending the display by the progress of the game, the user operation or the like (N in S24), data at t=t+Δt at next time is acquired (S26, S10), and the pieces of processing of S14 to S22 are repetitively executed. When there is caused the necessity for ending the display, all the pieces of processing are ended (Y in S24).

According to Embodiment 1 described so far, in the image generating apparatus for generating the image to be displayed on the head-mounted display, presence or absence of the motion of the head of the user wearing the head-mounted display are monitored, and for the period of time for which there is a motion, the resolution of at least a part of the area is reduced. As a result, a change in display fitting the characteristics of the human that the eyesight is reduced when seeing the moving thing can be artificially made, and the amount of data transmitted from the image generating apparatus to the head-mounted display can be reduced.

As a result, since the electric power necessary for the data transmission can be reduced, even when the communication between the head-mounted display and the image generating apparatus is unwired, the capacity of the built-in battery can be reduced, and thus the light weight and useful head-mounted display can be realized. In addition, a discomfort feeling in the head due to the generation of the heat from a power source can be prevented. In case of the wireless communication, it is considered that the communication situation becomes worse by the motion of the head-mounted display to limit the transmission band. As described above, the minimum necessary data is previously extracted for a period of time for which there is a motion, thereby enabling the bad influence exerted on the display image due to the worsening of the communication situation to be suppressed.

In addition, the reduction rate of the resolution is more suppressed or the resolution is not reduced in the area of the predetermined range from the gaze point than the area of the outside of the area of interest. As a result, even when the head is being moved, the high-definition image can be presented to the object at which the user gazes. In addition, the resolution of the peripheral area having the high recognition ability for the motion dares to reduce, thereby enabling the eye strain or the excessive stimulation to the inside of the brain to be suppressed. Moreover, the reduction rate of the resolution or the boundary between the areas in which the resolution is reduced is adjusted according to the speed of the motion of the head, thereby enabling the reduction of the resolution to be made hard to feel.

Embodiment 2

Figure 9:
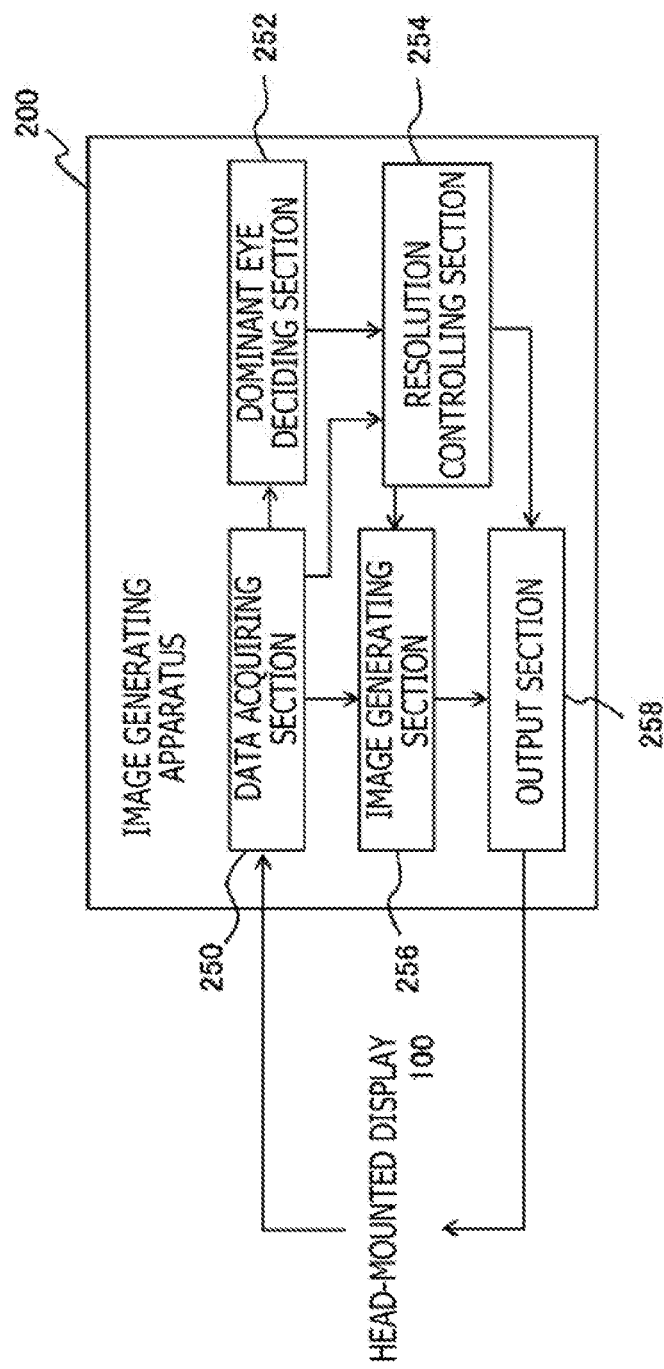
FIG. 9 is a block diagram depicting a configuration of a functional block of an image generating apparatus in Embodiment 2.

In Embodiment 1, the resolution is changed according to presence or absence of the motion or the speed of the head of the user. In Embodiment 2, the resolution is given a difference between the image for the left eye and the image for the right eye in the displayed stereo images. FIG. 9 depicts a configuration of a functional block of an image generating apparatus 200 in Embodiment 2. Thereafter, the processing common to that of Embodiment 1 will be suitably omitted in description. The image generating apparatus 200 has an internal circuit configuration depicted in FIG. 3, and a head-mounted display 100 connected to the image generating apparatus 200 may have a similar configuration to that depicted in FIG. 4. However, it is supposed that the measurement section 62 of the head-mounted display 100 includes such a gaze point detector as to be exemplified in FIG. 5.

The image generating apparatus 200 includes a data acquiring section 250, a dominant eye deciding section 252, a resolution controlling section 254, an image generating section 256, and an output section 258. The data acquiring section 250 acquires the data necessary for the processing from the head-mounted display 100. The dominant eye deciding section 252 decides a dominant eye of the left and right eyes. The resolution controlling section 254 sets the resolution of the stereo images in accordance with the decision by the dominant eye deciding section 252. The image generating section 256 generates the display image with the decided resolution. The output section 258 suitably shapes the data associated with the display image and outputs the resulting data to the head-mounted display 100.

The data acquiring section 250 functions similarly to the data acquiring section 50 of FIG. 4 and acquires the data necessary for the processing at a predetermined rate from the head-mounted display 100. However, the information associated with the position coordinates of the gaze point obtained by the gaze point detector is included in the acquired data. The dominant eye deciding section 252 decides one of the left and right eyes as the dominant eye on the basis of the change in position coordinates of the gaze point. It is known that the human essentially, dominantly uses one of the left and right eyes when seeing a thing. In general, the eye which is mainly used is referred to as the dominant eye, and the eye opposite to the dominant eye is referred to as a non-dominant eye.

The dominant eye is replaced with the other eye depending on the situation in some cases. Although various inspection methods have been proposed for the specification of the dominant eye, in Embodiment 2, the stability of the gaze point is set as the criterion, thereby deciding the dominant eye. In other words, of the left and right eyes, the eye whose motion of the gaze point is more stable is defined as the dominant eye in a broad sense. For this reason, the dominant eye deciding section 252 holds the position coordinates of the gaze points at predetermined time right before the decision to evaluate the stability and decides the eye having the higher stability as the dominant eye. Any of the general statistical methods of performing principal component analysis of distribution of the position coordinates or obtaining the standard deviation may be adopted for the evaluation of the stability.

The dominant eye deciding section 252 may only decide the dominant eye at the time of the start of the image display in the head-mounted display 100, or may always monitor the stability of the gaze point and decide the dominant eye at any time on the basis of the monitoring result. The dominant eye deciding section 252 may hold inside thereof the data obtained by associating the user and the dominant eye with each other to be fixed for each user. The resolution controlling section 254 sets the resolution of at least a part of image for the non-dominant eye of the stereo images to be displayed so as to be lower than the resolution of the image for the dominant eye.

The image generating section 256 functions similarly to the image generating section 56 of FIG. 4 and generates the display image at a frame rate for display with the resolution set by the resolution controlling section 254. The contents of the image and the way of reducing the resolution are similar to those described in Embodiment 1. The output section 258 functions similarly to the output section 58 of FIG. 4 and suitably shapes the data associated with the generated image and successively transmits the resulting data to the head-mounted display 100. At this time, in the case where the resolution is made to differ depending on the resolutions or the areas of the stereo images, the information associated with the resolution such as the data obtained by associating the area and the resolution with each other is transmitted as the additional data for each frame.

Figure 10:
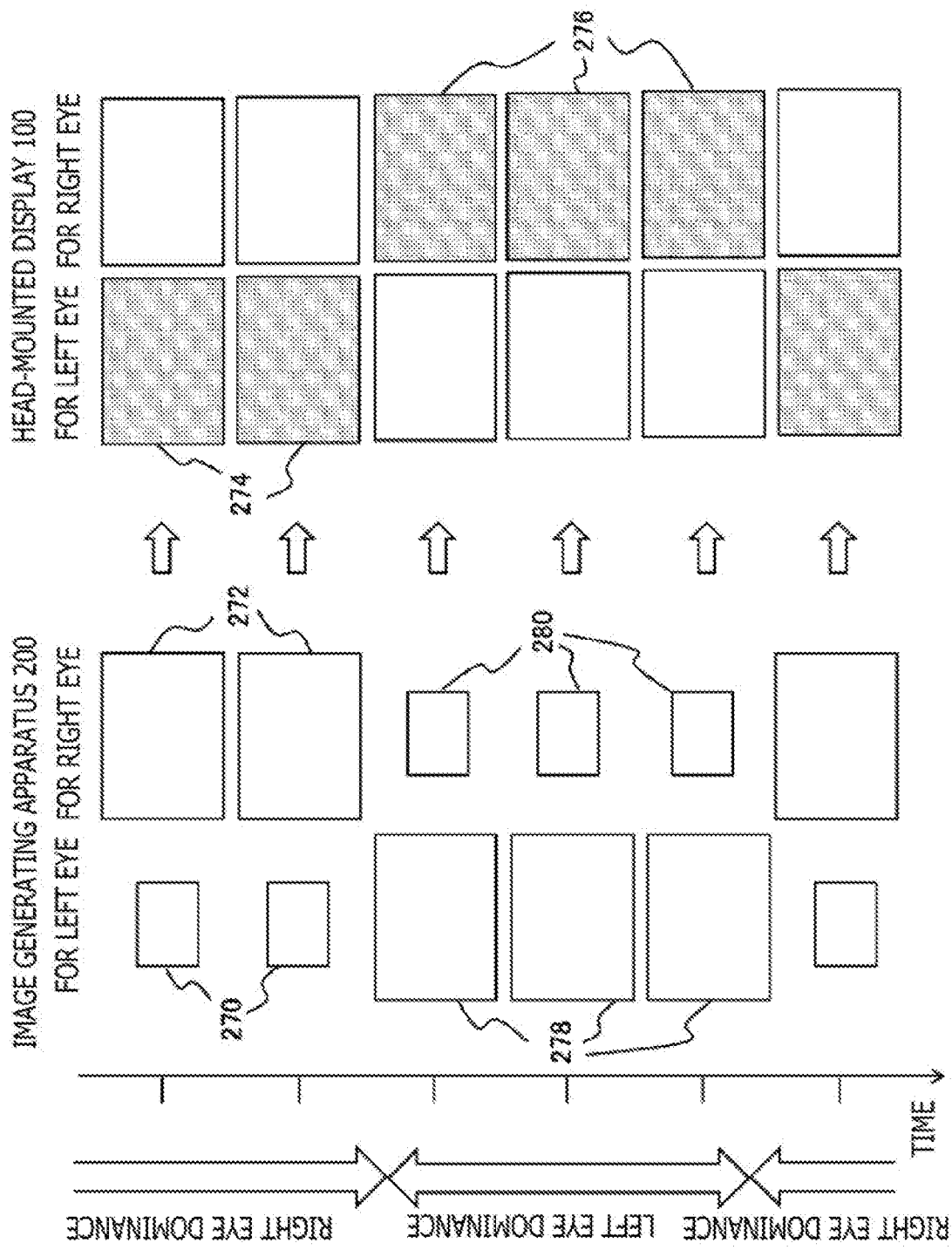
FIG. 10 is a view schematically depicting a temporal change of a frame constituting a display image in Embodiment 2.

FIG. 10 schematically depicts a temporal change of a frame constituting the display image. The way of representing the figure is similar to the case of FIG. 6. Firstly, for the period of time "right eye dominance", for which the dominant eye is the right eye, the image generating apparatus 200 generates an image 272 for the right eye with the resolution corresponding to the display resolution of the head-mounted display. On the other hand, with respect to an image for the left eye, the resolution is reduced, thereby generating a display image 270 which is smaller in size than the image for the right eye.

In the head-mounted display 100 which receives such data, the image for the right eye is displayed as it is, and the image for the left eye is enlarged to be displayed. As a result, in the display image 274 for the left eye, the high-frequency components become less than those of the original image. In other words, the stereo images which are different in frequency components in addition to a point of view from each other are displayed. Even if such a procedure is adopted, when these images are simultaneously seen, the reconstitution in the brain enables the solid body which is not changed from the ordinary case to be recognized. According to the experiments by the present inventor, it was confirmed that even when the resolution of one of the stereo images is made approximately one-fourths of that of the other, that does not exert an influence on the stereo vision. Therefore, the amount of data which is transmitted with a smaller influence on the stereo vision exerted on the stereo vision can be reduced, and thus the power consumption can be suppressed.

When the dominant eye is changed to "the left eye dominance," in which the dominant eye is the left eye, the image generating apparatus 200 reverses high and low of the resolution of the left and right images. In other words, the image 278 for the left eye is generated with the resolution corresponding to display resolution of the head-mounted display, and for the image for the right eye, the resolution is reduced, thereby generating the display image 280 having the smaller size than that of the image for the left eye. As a result, in the head-mounted display 100, the image for the left eye is displayed as it is, and the image for the right eye is displayed as an enlarged image 276.

When the dominant eye proceeds to "the right eye dominance" again, high and low of the resolutions of the left and right images are reversed again. The way of reducing the resolution is similar to that in Embodiment 1, that is, the resolutions of the entire image may be uniformly reduced, or as exemplified in FIG. 7, the resolution may be reduced except for the area in the predetermined range from the gaze point. It should be noted that also in the display image for the dominant eye, the resolution of the periphery may be reduced, and in the image for non-dominant eye, the area of the area in which the resolution is reduced may be made larger than that of the image for the dominant eye.

Reducing the resolution of one image of the stereo images in such a manner offers the effect of improving the eye strain in addition to reducing the amount of transmitted data. In other words, the detailed image is displayed in the front of the non-dominant eye, resulting in that although the difference is naturally given between the amounts of information which are acquired in the dominant eye and the non-dominant eye to essentially obtain the balance between them, the excessive amount of information also enters the non-dominant eye, and as a result, the eye strain and the state of being hard to see a thing are caused.

It is well known in the field of the eyesight correction technology or the like that the eyesight of the non-dominant eye is excessively corrected, thereby causing the problem such as the eye strain or the anisometropia. In addition, a method with which the dominant eye is subjected to distance correction, and the non-dominant eye is subjected to near vision correction, thereby performing the presbyopia correction is known as the mono-vision method. The amount of information which is presented as the image is adjusted in the left and right eyes in consideration of such a difference in function between both the eyes, thereby enabling the display form in which a thing is easier to see, and tiredness is less. Incidentally, a timing at which high and low of the resolution is switched between the left and right images may be set as a time point at which the dominant eye based on the stability of the gaze point is switched, or may be carried out at a delimiter of the content in which the switching or the like of the scene is displayed. If like the latter, the timing is adjusted by the display contents, then, in terms of recognition of the user, the seamless switching can be realized.

Figure 11:
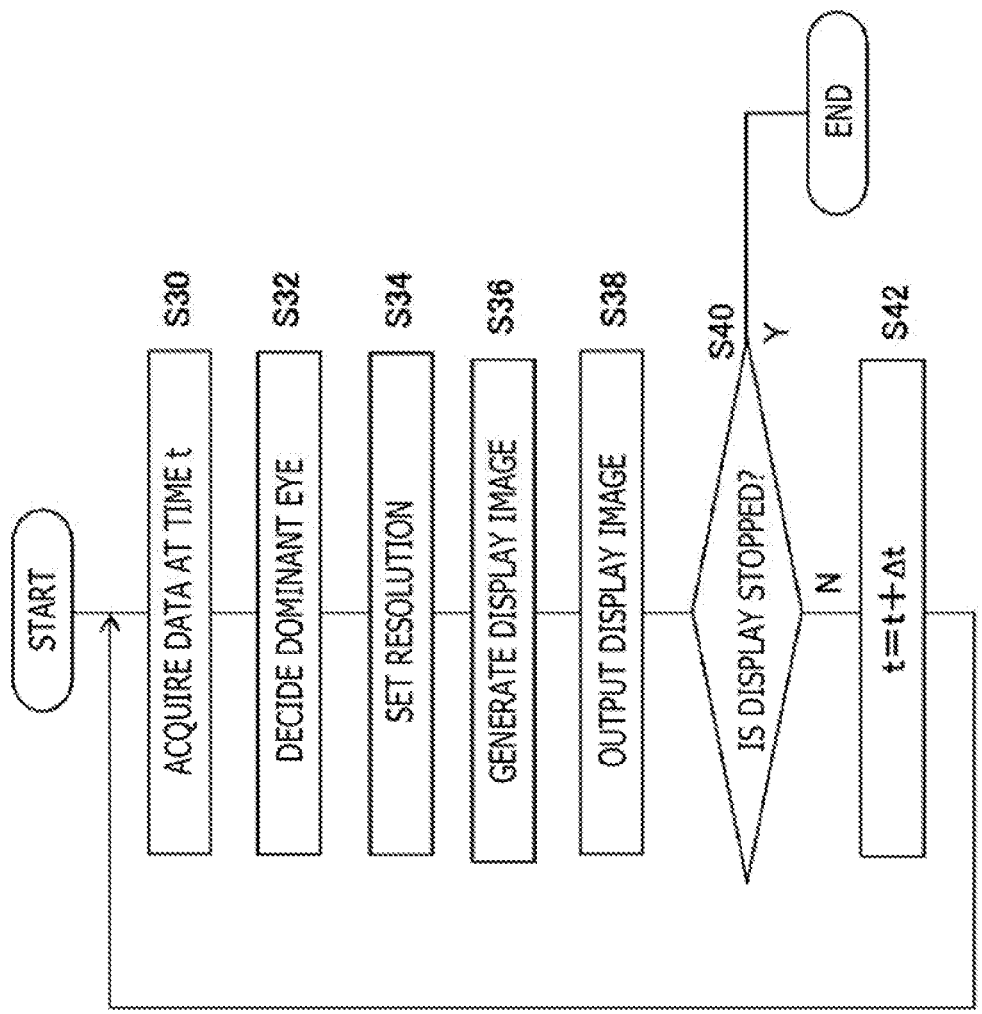
FIG. 11 is a flow chart depicting a procedure for generating and outputting a display image in a state in which a difference is made in a resolution of stereo images depending on a dominant eye or a non-dominant eye by the image generating apparatus in Embodiment 2.

Next, a description will be given with respect to an operation, of the image generating apparatus 200, which can be realized with the configuration described until now. FIG. 11 is a flow chart depicting a procedure for making a difference in resolution between the stereo images depending on the dominant eye or non-dominant eye by the image generating apparatus 200, thereby generating and outputting the display image. This flow chart is started when after the user wears the head-mounted display 100, and a request to start the electronic content followed by the image display on the head-mounted display 100 is inputted, and so forth.

Firstly, the data acquiring section 250 of the image generating apparatus 200 acquires the data associated with the position coordinates of the gaze point of the user at the current time t from the head-mounted display 100 (S30). At this time, the data acquiring section 250 also suitably acquires the data necessary for generation of the display image, that is, the data associated with the photographed image or the sensor measurement value. The dominant eye deciding section 252 evaluates the stability of the position coordinates of the gaze point on the basis of a predetermined criterion and decides the eye having the higher stability as the dominant eye (S32).

Then, the resolution controlling section 254 sets the standard resolution for the display image for the dominant eye, while the resolution controlling section 254 makes such setting as to reduce the resolution of at least a part of the display image for the non-dominant eye, and notifies the image generating section 256 of this effect (S34). The image generating section 256 generates the stereo images for the display having the field of view corresponding to the line of sight of the user at the time t with the resolution following the setting (S36). The image generating section 256 further creates, as additional data, information associated with the resolution of the generated display image and information in which the area and the resolution are associated with each other.

The output section 258 suitably subjects the generated data associated with the generated display image to the shaping, the compression-coding, and the like, and transmits the resulting data together with the additional data to the head-mounted display 100 (S38). Similarly to Embodiment 1, the resolution of the image for the non-dominant eye may be substantially reduced by removing the high-frequency components in this compression processing. For a period of time for which there is not caused the necessity for ending the display due to the progress of the game, the user operation or the like (N in S40), the data at next time t=t+Δt is acquired (S42, S30), and the pieces of processing of S32 to S38 are repetitively executed. When there is caused the necessity for ending the display, all the pieces of processing are ended (Y in S40).

According to Embodiment 2 described so far, the position coordinates of the gaze point of the user for the stereo image for the stereo vision which is displayed on the head-mounted display are acquired. Then, in the image generating apparatus which generates the display image, the eye in which the motion of the gaze point is more stable is decided as the dominant eye, and the resolution of the area of at least a part of the display image for the non-dominant eye is reduced. As a result, an amount of data which is transmitted from the image generating apparatus to the head-mounted display can be reduced without injuring the three-dimensional effect.

As a result, since the electric power necessary for the data transmission can be reduced, even when the communication between the head-mounted display and the image generating apparatus is unwired, the capacity of the built-in battery can be reduced, and thus the light weight and useful head-mounted display can be realized. In addition, a discomfort feeling in the head due to the generation of the heat from a power source can be prevented. Moreover, since an amount of information which enters non-dominant eye, which is essentially suppressed in use is reduced, there is also an effect in the improvement in the eye strain, the state of being hard to perform the stereo vision, the sickness or the like.

The present invention has been described so far on the basis of Embodiments. It is understood by a person skilled in the art that Embodiments described above are an exemplification, various variations can be made in combination of the constituent elements thereof and the processes, and such variations fall within the scope of the present invention.

Figure 12:
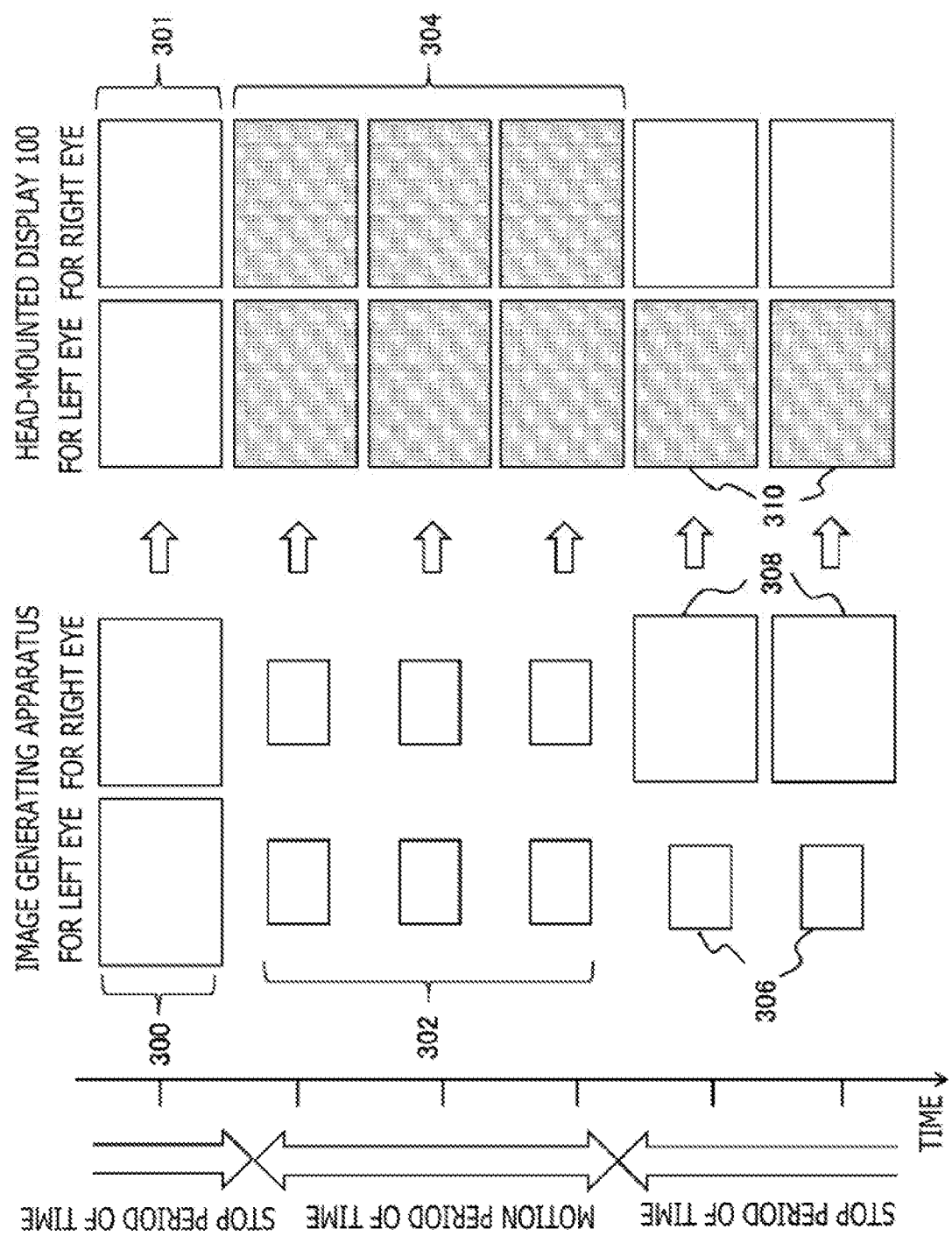
FIG. 12 is a view schematically depicting a temporal change of a frame constituting a display image when processing of reducing the resolution based on a motion of a head, and adjustment of the resolution based on dominance of the eye are combined with each other in a variation of Embodiments.

For example, Embodiment 1 and Embodiment 2 may be combined with each other. FIG. 12 schematically depicts a temporal change of the frame constituting the display image when the processing of reducing the resolution based on the motion of the head and the adjustment of the resolution based on the dominance of the eye are combined with each other. The way of representing a figure is similar to the case of FIG. 6, and FIG. 10. Firstly, for "the stop period of time" for which there is no motion of the head, the image generating apparatus, as described in Embodiment 1, generates a display image 300 with the resolution corresponding to the display resolution of the head-mounted display. As a result, the generated display image is displayed on the head-mounted display 100 as it is (a display image 301).

Then, when the operation proceeds to "the motion period of time" for which the head is decided to be moved, the image generating apparatus reduces the resolution, thereby generating a display image 302 having the smaller size than that of the stop period of time. The head-mounted display 100 enlarges the display image 302 and displays the resulting display image (a display image 304). Next, when the head is stopped again, like Embodiment 2, the resolution of one of the left and right display images is returned back to standard one. In the example of the figure, only the resolution of the image 308 for the right eye is returned back to the original one, and for the display image 306 for the left eye, the resolution is held reduced.

By adopting such a procedure, the amount of data to be transmitted can be prevented from being increased as soon as the head is stopped, and the latency until display and a change for the worse in the communication state due to the abrupt change of the used transmission band can be suppressed. In addition, as described in Embodiment 1 or Embodiment 2, the influence exerted on the recognition of the image can be reduced, the amount of data transmission can be suppressed, and the power consumption can be reduced.

With respect to the resolution of which of the images when the head is stopped is returned back to the original one, after the stability of the gaze point at that time point is evaluated, the image having the higher stability may be selected. Alternatively, the resolution of the image may be fixed each user irrespective of the situation, or the setting common to the users may be made. The aspect in which the resolution of the image is decided irrespective of the situation of the gaze point can be realized by using the configuration of the image generating apparatus 10 depicted in FIG. 4. The aspect in which after the dominant eye is decided on the basis of the stability of the gaze point, the resolution of interest is returned back to the original one can be realized by providing the dominant eye deciding section 252 depicted in FIG. 9 in the image generating apparatus 10.

In addition, after only for the predetermined time after the head is stopped, the resolution of one of the left and right display images is set to the low resolution to suppress an abrupt increase in amount of data transmission, finally the resolutions of both the stereo images may be set to the standard resolutions, or for the stop period of time for the head, Embodiment 2 may be continuously introduced.

Moreover, for the period of time for which the head is moved, a difference may be made between the resolutions of the left and right display images. In other words, the resolution of one display image is more reduced relative to the resolution of the other display image. Also by adopting such a procedure, the possibility that the three-dimensional effect is injured as described in Embodiment 2 is low. As a result, the amount of data transmission can be further reduced without for the user being conscious.

In addition, although in Embodiment 1, by paying attention to the speed of the head, the resolution is reduced or is returned back to the original one, the stability of the gaze point described in Embodiment 2 may be utilized instead of utilizing the speed of the head. Specifically, the motion detecting section 52 monitors the motions of the left and right gaze points. When the left and right gaze points lie in the same area within the same area of the predetermined range in the display image for equal to or longer than the predetermined time, the resolution controlling sections 54 sets the standard resolution. At this time as well, high and low may be set in the resolutions between the area of interest and the area other than the area of interest. Then, when at least any one of the left and right gaze points deviates from the area of interest, or a deviation state is continuous for equal to or longer than the predetermined time, the resolution is reduced. As a result, in the state in which the point of view is not determined irrespective of the motion of the head, the influence exerted on the visibility can be made less and the size of the transmission data can be suppressed. In addition, when the motion detecting section 52 monitors both the motion of the head and the stability of the point of view, when and it is decided that there is a motion of the head or the point of view is unstable, the resolution may be reduced.

Moreover, although in Embodiments 1 and 2, the description has been given with respect to the aspect in which the resolution of the display image is actually reduced on the basis of the motion of the head or the stability of the gaze point, a parameter other than these may be adopted. In this case, instead of providing the resolution controlling sections 54 and 254, a parameter controlling section which controls the parameter of interest is provided. For example, the parameter controlling section may reduce the compression rate when the image is transmitted from the image generating apparatus 10, or may lower a bit depth of the pixel value. In addition, of the image data for which one pixel is constituted by a plurality of channels, the resolution of the predetermined channel may be reduced. For example, of the data associated with the color images of red, green, and blue (RGB), each of the resolutions of red and blue may be made lower than the resolution of green. In this case, at the time of the display, the image data of the channel having the lower resolution is enlarged by the interpolation, and so forth, thereby unifying the resolutions between the channels. In addition, the contrast or frame rate of the image may be reduced, or a gamma curve may be changed, thereby narrowing a luminance range.

In the case where this is applied to Embodiment 2, for example, it is considered that the compression rate of one of the image for the left eye and the image for the left eye is made higher than that of the other, the one frame rate is made lower than the other frame rate, and so forth. In addition, it is considered that the bit depth of one of the pixel values is made lower than that of the other of the pixel values. At this time, a difference may not be made for the pixel value of the specific channel such as green, but the bit depth may be made low only for the pixel values of the channels such as red and blue other than the specific channel to further suppress the influence exerted on the display. Even in the case where such a parameter is changed, the amount of change may be made to differ between the gaze area and the other areas. In addition, the parameter controlling section may make a change in combination of at least any one of these parameters, and the resolution.

In any case, when for the period of time for which the head is moved or the gaze point is unstable, these parameters are adjusted so that the size of the data to be transmitted becomes small, the influence exerted on the appearance is held to the minimum, and thus the environment of the image appreciation can be made good. In addition, it is considered that even in case of the parameter which does not contribute to the reduction of the data size, the eye strain is reduced, or the images having a difference and visually recognized by the left and right eyes are reconstituted within the brain, thereby obtaining the new visual effect. In such a purpose, in addition to the foregoing, various parameters associated with the image data can be made a target in which a difference is made between the left and right images.

In addition, in Embodiment 2, the eye in which the motion of the gaze point is more stable is made the dominant eye, and the resolution of the display image for the eye on the side opposite to the dominant eye is reduced. On the other hand, the image for which the resolution is reduced may be decided in accordance with other rules. For example, the image for which the resolution is reduced irrespective of the stability of the gaze point may be decided as one of the left and right images. Moreover, high and low of the resolution may be forcibly switched every predetermined time, or at a predetermined timing such as the switching of the scene of the displayed content.

In such a case, the resolution of the entire image of one of the two images may be reduced, or the area in which the resolution is reduced may be limited depending on the position of the gaze point. For example, for a period of time for which the gaze points of the left and right eyes are located in the same position on the image, the standard resolution is set to the area in the predetermined range including the position of the interest, and a resolution of the area other than the area in the predetermined range is reduced. Alternatively, for a period of time for which the gaze points of the left and right eyes stay within the same range on the image for equal to or longer than a predetermined time, the standard resolution may be set to the area of the range of interest, and a resolution of the area other than the area in the predetermined range may be reduced. Since these situations mean that the point of view is determined in a certain area, the resolution is returned back to the original one in response to the generation of such an area, thereby enabling the influence exerted on the visibility to be held to the minimum.

The human has the characteristics that he/she preferentially uses the eye by which a thing can be seen in more detail to see the thing. Therefore, as described above, high and low is provided in the resolutions of the images for the left and right eyes, whereby the eye to which the image having the high resolution is presented is naturally used. It can be said that the dominant eye is induced by the resolution of the display image. Then, since the image having the high resolution is switched at the predetermined timing, thereby enabling the eye which is mainly used to be switched, the eye strain is harder to cause than the case where only one eye is strained. As a result, the image which causes less strain and less sense of discomfort in stereo vision can be realized with the less amount of data trans-mission. Incidentally, the parameter which is switched at the predetermined timing for the left and right images is not limited in resolution, but may be any of the compression rate, frame rate, bit depth and the like described above, and even when any two or more parameters of these parameters may be simultaneously switched, similar effects to those described until now can be achieved.

In addition, in Embodiments 1 and 2, the adjustment of the resolution is wholly performed in the image generating apparatus. On the other hand, in the case where the data associated with the photographed image is transmitted from the head-mounted display to the image generating apparatus, the adjustment of the resolution may be performed in a camera of the head-mounted display. In other words, in a stage in which the data associated with the photographed image which is the transmitted to the image generating apparatus is generated from the so-called RAW image detected by an imaging element array, the processing for reducing the resolution is executed.

A similar criterion such as the motion of the head or the dominant eye described in Embodiment 1 or 2 may be used in the reduction of the resolution in this case. At this time, the image generating apparatus 10 or 200 transmits the result of setting the resolution by the resolution controlling section 54 or 254 from the output section 58 or 258 to the head-mounted display 100. In response to the result of setting the resolution, the imaging section 60 of the head-mounted display 100 generates the data associated with the photographed image with the resolution following the setting and transmits the data associated with the photographed image from the communication section 64 to the image generating apparatus 10 or 200. As a result, the amount of data transmission not only from the image generating apparatus to the head-mounted display, but also from the head-mounted display to the image generating apparatus can be reduced, and thus the power consumption can be further suppressed.

REFERENCE SIGNS LIST

10 Image generating apparatus, 23 CPU, 24 GPU, 26 Main memory, 50 Data acquiring section, 52 Motion detecting section, 54 Resolution controlling section, 56 Image generating section, 58 Output section, 60 Imaging section, 62 Measurement section, 64 Communication section, 66 Image forming section, 68 Display section, 100 Head-mounted display, 110 Stereo camera, 250 Data acquiring section, 252 Dominant eye deciding section, 254 Resolution controlling section, 256 Image generating section, 258 Output section.

INDUSTRIAL APPLICABILITY

As set forth hereinabove, the present invention can be utilized in various kinds of information processing apparatuses such as a game apparatus, an image processing apparatus, and a content reproducing apparatus, a system including those, and the like.

The invention claimed is:
1. An image generating apparatus, comprising:
a motion detecting section acquiring information associated with a motion of a head of a user wearing a head-mounted display and deciding presence or absence of the motion;
a resolution controlling section performing setting in which a resolution of a part of a display image is more reduced when there is a motion of the head than when there is no motion of the head;

an image generating section generating a display image with a resolution following the setting; and an output section outputting data associated with the display image to the head-mounted display, wherein an entirety of the display image is shown at a full resolution when there is no motion of the head, wherein the part of the display image having reduced resolution is plane-divided into a plurality of adjacent subareas, with each subarea of the plurality of subareas having decreased resolution from an adjacent subarea, wherein the image generating section generates stereo images including a pair of an image for a first eye and an image for a second eye as the display image, and wherein, when transmission is made from a state in which there is a motion of the head to a state in which there is no motion of the head, the resolution controlling section provides a period of time for which the resolution of the image for the first eye is returned back to an original resolution before the image for the second eye is returned back to the original resolution.

2. The image generating apparatus according to claim 1, wherein the resolution controlling section acquires information associated with position coordinates of a gaze point of the user for an image displayed on the head-mounted display and, in the display image, sets a resolution of an outside of a gaze area in a predetermined range from the gaze point so as to be lower than a resolution of an inside of the gaze area in the predetermined range from the gaze point.

3. The image generating apparatus according to claim 2, wherein the resolution controlling section sets the gaze area so as to be narrower as the speed of the head is higher.

4. The image generating apparatus according to claim 1, wherein the resolution controlling section sets the resolution of the display image lower as a speed of the head is higher.

5. The image generating apparatus according to claim 1, further comprising:

a data acquiring section acquiring data associated with a photographed image which is photographed with the head-mounted display and used in generation of the display image, wherein the resolution controlling section causes data transmitted, the data for which a resolution of a part of the photographed image is more reduced when there is the motion of the head than when there is no motion of the head, to the head-mounted display.

6. The image generating apparatus according to claim 1, further comprising:

a dominant eye deciding section for determining a dominant eye having a higher gaze stability, wherein the resolution controlling section displays a higher resolution display image to the dominant eye than an other eye.

7. An image generating method by an image generating apparatus, comprising:

acquiring information associated with a motion of a head of a user wearing a head-mounted display and deciding presence or absence of the motion;

performing setting in which a resolution of a part of a display image is more reduced when there is a motion of the head than when there is no motion of the head;

generating a display image with a resolution following the setting; and outputting data associated with the display image to the head-mounted display, wherein an entirety of the display image is displayed at a full resolution when there is no motion of the head, wherein the part of the display image having reduced resolution is plane-divided into a plurality of adjacent subareas, with each subarea of the plurality of subareas having decreased resolution from an adjacent subarea, and wherein the display image includes a pair of an image for a first eye and an image for a second eye; and providing a period of time for which the resolution of the image for the first eye is returned back to an original resolution before the image for the second eye is returned back to the original resolution when transmission is made from a state in which there is a motion of the head to a state in which there is no motion of the head.

8. A non-transitory computer readable medium having stored thereon a computer program for a computer, the computer program comprising:

by a motion detecting section, acquiring information associated with a motion of a head of a user wearing a head-mounted display and deciding presence or absence of the motion;

by a resolution controlling section, performing setting in which a resolution of a plurality of areas of a display image are more reduced when there is a motion of the head than when there is no motion of the head;

by an image generating section, generating a display image with a resolution following the setting; and by an output section, outputting data associated with the display image to the head-mounted display, wherein the plurality of areas are a plurality of concentric rings centered at a focus point, wherein a resolution of each concentric ring has decreased resolution from an adjacent inner concentric ring, wherein the image generating section generates stereo images including a pair of an image for a first eye and an image for a second eye as the display image, and wherein, when transmission is made from a state in which there is a motion of the head to a state in which there is no motion of the head, the resolution controlling section provides a period of time for which the resolution of the image for the first eye is returned back to an original resolution before the image for the second eye is returned back to the original resolution.

* * * * *